(12) United States Patent
Wang (10) Patent No.: US 8,197,140 B2
(45) Date of Patent: *Jun. 12, 2012

(54) PRELOAD BIASED STRUCTURE OF LINEAR RAIL

(75) Inventor: Chin-Hsiang Wang, Sansia Township, Taipei County (TW)

(73) Assignee: OME Technology Co., Ltd., Taipei County (TW)

( * ) Notice: Subject to any disclaimer, the term of this patent is extended or adjusted under 35 U.S.C. 154(b) by 554 days.

This patent is subject to a terminal disclaimer.

(21) Appl. No.: 12/382,583

(22) Filed: Mar. 19, 2009

(65) Prior Publication Data

US 2010/0142866 A1 Jun. 10, 2010

(30) Foreign Application Priority Data

Dec. 5, 2008 (TW) ................................ 97221790 U (51) Int. Cl.
*F16C 29/06* (2006.01)
*F16C 29/04* (2006.01)
(52) U.S. Cl. ............................... 384/43; 384/44; 384/49
(58) Field of Classification Search .............. 384/43–45, 384/49–50
See application file for complete search history.

(56) References Cited

U.S. PATENT DOCUMENTS

| 6,200,031 | B1 * | 3/2001 | Faulhaber et al. | 384/45 |
|---|---|---|---|---|
| 6,520,681 | B2 * | 2/2003 | Ishihara | 384/45 |
| 7,306,373 | B2 * | 12/2007 | Yamazaki et al. | 384/45 |
| 7,748,906 | B2 * | 7/2010 | Wang | 384/45 |
| 2002/0021847 | A1 * | 2/2002 | Wu | 384/45 |
| 2002/0181810 | A1 * | 12/2002 | Menges et al. | 384/45 |
| 2005/0018934 | A1 * | 1/2005 | Lee et al. | 384/45 |
| 2005/0232520 | A1 * | 10/2005 | Yamazaki et al. | 384/45 |
| 2006/0029306 | A1 * | 2/2006 | Ishihara | 384/45 |
| 2006/0078236 | A1 * | 4/2006 | Lee | 384/45 |
| 2009/0067763 | A1 * | 3/2009 | Wang | 384/45 |

* cited by examiner

*Primary Examiner* — Marcus Charles
(74) *Attorney, Agent, or Firm* — Rosenberg, Klein & Lee (57) ABSTRACT

A preload biased structure of a linear rail includes a rail and a sliding block disposed on the rail. The sliding block includes a sliding base, a supporting element, two connecting pieces and two locking pieces. The sliding element is provided with a connecting space. The front and rear end of the sliding base each is provided with abutting pieces. The abutting piece extends to form a biased block toward the connecting space. The biased block extends to form a biased slope. In assembling, the biased slope guides the supporting element to be inserted in the connecting space. The biased block provides a preloading force, whereby the supporting element can be fixed in the sliding base in advance. The locking pieces lock the two connecting pieces on both ends of the sliding base, so that the supporting element and the two connecting pieces can be assembled on the sliding base.

10 Claims, 7 Drawing Sheets

PRELOAD BIASED STRUCTURE OF LINEAR RAIL

BACKGROUND OF THE INVENTION

1. Field of the Invention

The present invention relates to a locking structure, and in particular to a preload biased structure of a linear rail for locking a sliding block tightly in advance.

2. Description of Related Art

Precision industry has become one of the foundations of the modern high-tech culture. Precision industry is part of various traditional industries, such as photo-electronics, semiconductor, timepiece, mold, nanotechnology and etc.

In the field of precision industry, linear transmission elements and their associated products are widely used to many aspects, such as linear rails and ball screws. Especially, the linear rails have been widely mounted on many large-sized precision machines and equipment, thereby increasing the precision, smoothness, stability and lifetime of the parts of the machine.

Specifically speaking, the linear rail becomes more and more important and even indispensable. The linear rail is used to generate a precise linear displacement, thereby allowing a machine to perform a transmission, machining or positioning action with high precision. The linear rail refers to a combination of a rail and a sliding block movable linearly on the rail. The sliding block is constituted of a plurality of precision elements. The sliding block is used to support an object that is to move linearly thereon.

Since the linear rail is applied to a high-precision process, the acceptable error is very small. A minor defect in the linear rail may cause a serious problem, and in turn the manufacturer may suffer great losses. Please refer to FIG. 1, which shows a conventional linear rail. The conventional linear rail comprises a rail 1a and a sliding block 2a. The sliding block 2a is slidably disposed on the rail 1a. The sliding block 2a is constituted of a sliding element 21a, a supporting element 22a and two connecting pieces 23a provided on the front and rear end of the sliding base 21a. The above three members are slidably disposed on the rail 1a. The above members constitute a linear rail, whereby the sliding block 2a can generate an expected linear displacement on the rail 1a.

However, in practice, the conventional linear rail has some problems as follows.

Figure 1:
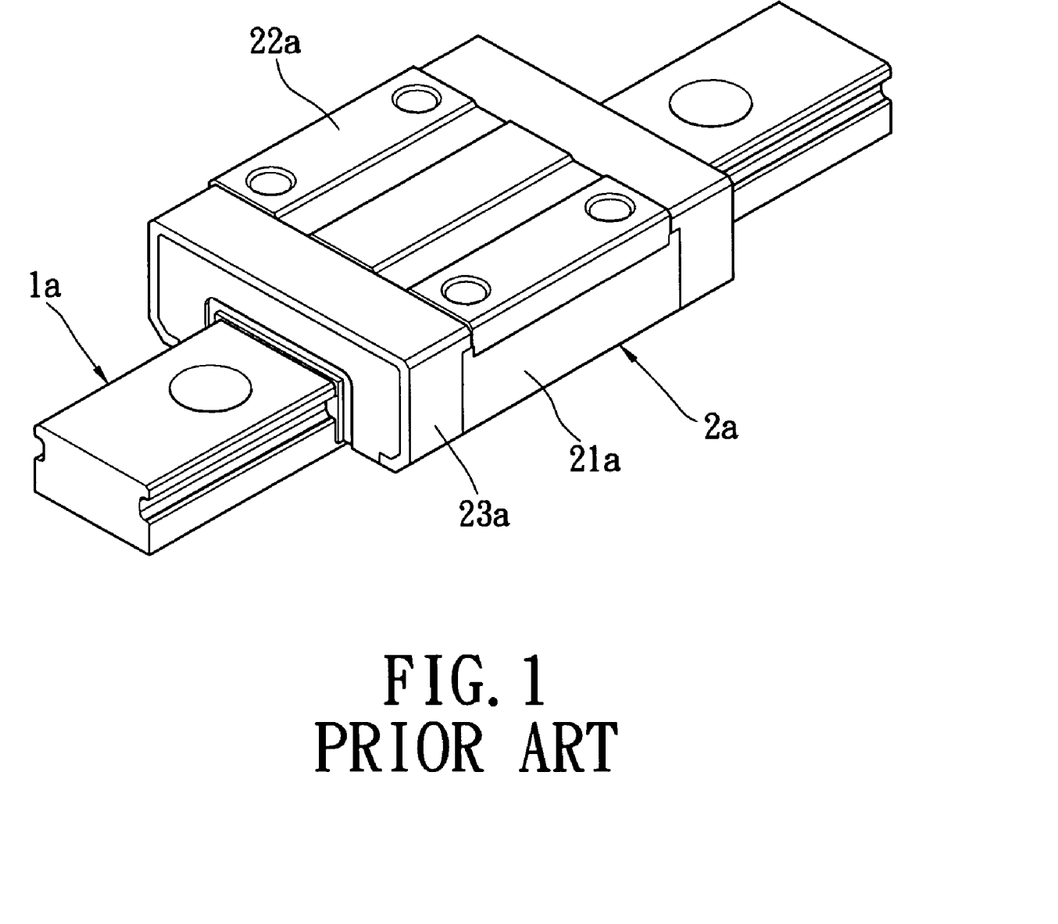
FIG. 1 is a schematic view showing the structure of a conventional linear rail.

(I) In assembling, the supporting element 22a and the sliding base 21a cannot be fixed to each other tightly in advance. Therefore, vibrations or collision generated in assembling may cause the supporting element 22a to loosen and fall off the sliding base 21a.

(II) When the sliding block 2a generates a reciprocating movement on the rail 1a, a force may be generated in longitudinal direction (i.e., the moving direction). Thus, the connecting pieces 23a at the front and rear end of the sliding rail 2a may be subjected to a compression force or a tensile force. These forces will cause the constituent elements in the sliding block 2a to vibrate due to tiny gaps between these constituent elements, so that noise and excessive wear will occur. Even damage may occur to the linear rail. Because of the above limitation resulting from the technical design of the prior art, the inventor strives via real world experience and academic research to develop the present invention, which can effectively improve the limitations described above.

SUMMARY OF THE INVENTION

The object of the present invention is to provide a preload biased structure of a linear rail, whereby the constituent elements of the sliding block can be preloaded when assembling the linear rail. In this way, the constituent elements of the sliding block can be prevented from loosening. Thus, the sliding block has a firm structure.

In order to achieve the above objects, the present invention provides a preload biased structure of a linear rail, which comprises a rail; a sliding block slidably disposed on the rail, the sliding block having: a sliding base, the front and rear end of the sliding base each having a positioning plate, a connecting space being formed between the positioning plates, the positioning plate having two protruding plates and two through-holes, the protruding plate extending integrally from both sides of the positioning plate, the protruding plate being provided with a locking hole, the through-holes passing through the protruding plate adjacent to the positioning plate, an abutting piece protruding downwards from the connecting portion between the positioning plate and the protruding plate toward the through-hole, an biased block extending from one end of the abutting piece facing the connecting space, the biased block being provided with a biased slope, the other end of the abutting piece being provided with a slope; a supporting element provided in the connecting space, the front and rear end of the supporting element being provided with a trough corresponding to the biased block, respectively, the biased slope guiding the supporting element to lock the biased block into the trough, thereby preloading and fixing the supporting element; two connecting pieces connected to the front and rear end of the sliding base, respectively, the end of the connecting piece facing the sliding base being provided with two insertion slots, the protruding plate being inserted in the insertion slot, the top surface of the connecting piece being provided with two insertion holes for communicating the insertion slots; and two locking pieces, both sides of the bottom surface of the locking piece extending downwards to form a hook respectively, the hook penetrating the insertion hole and the locking hole to be inserted into the insertion slot, thereby hooking the connecting piece to the front and rear end of the sliding base, the hook abutting the slope to press the biased block into the trough of the supporting element.

The present invention has advantageous features as follows.

The biased block of the present invention provides a preloaded effect. In assembling, the sliding base and the supporting element can be locked to each other in advance, thereby avoiding the supporting element from falling off the connecting space due to the vibrations caused in assembling. Further, the locking piece is inserted in the insertion slot to abut the slope of the abutting piece, so that the biased block of the abutting piece protrudes further toward the connecting space and thus the biased block is pressed in the trough of the supporting element completely. In this way, the supporting element and the two connecting pieces can be assembled on the sliding base tightly and firmly, thereby avoiding the vibrations, noises and wear.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF THE PREFERRED EMBODIMENTS

Please refer to FIGS. 2 to 7. The present invention provides a preload biased structure of a linear rail, which includes a sliding block 1 and a rail 2. The sliding block 1 is slidably disposed on the rail 2. The sliding block 1 comprises a sliding base 10, a supporting element 12 connected in the sliding base 10, two connecting pieces 13 and two locking pieces 14.

Figure 2:
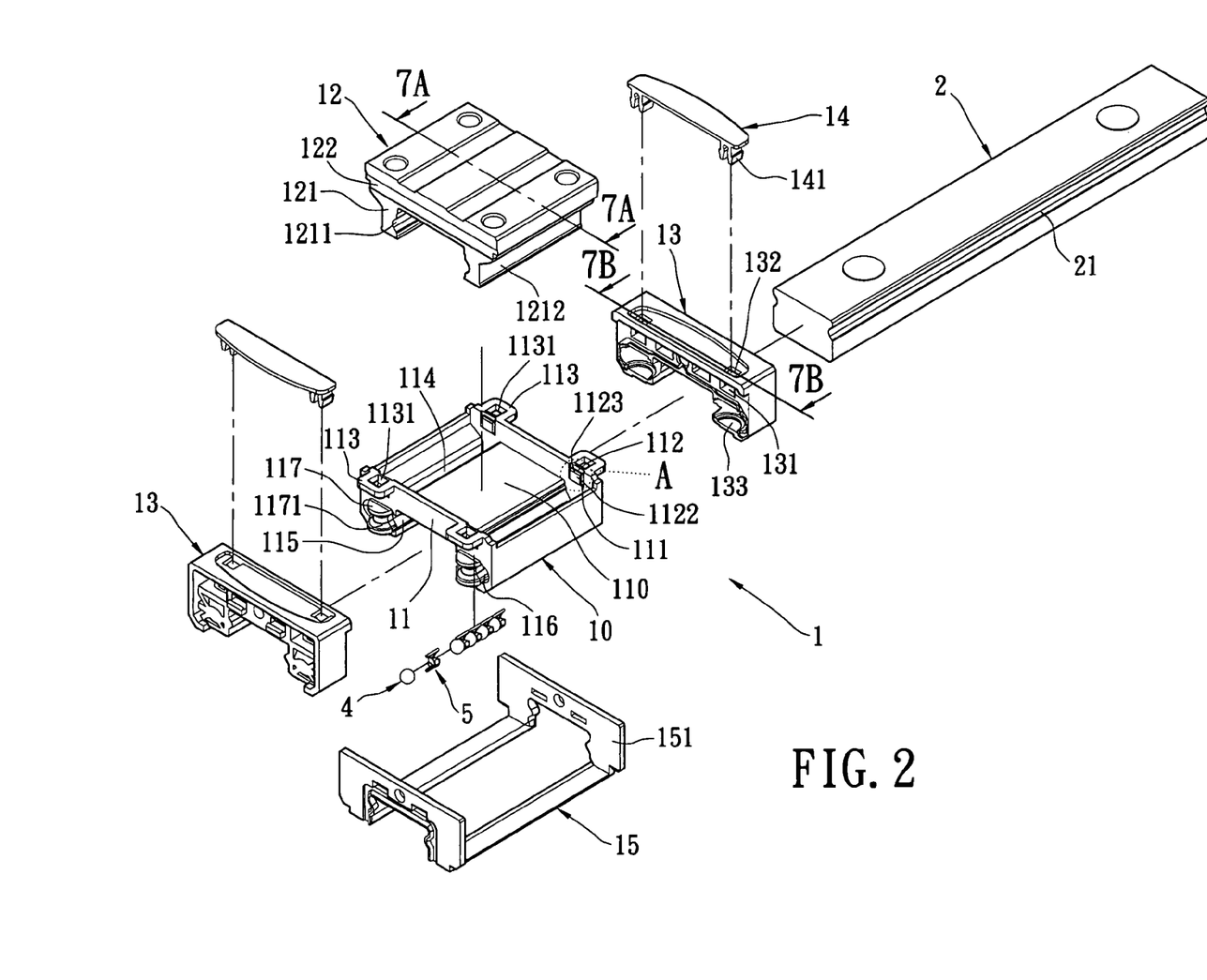
FIG. 2 is an exploded perspective view showing the preload biased structure of a linear rail according to the present invention.

Please refer to FIG. 2. The front and rear end of the sliding base 10 extend upwards to form a positioning plate 11 respectively. A connecting space 110 is formed between the positioning plates 11 provided on the front and rear end of the sliding base 10. Two protruding plates 113 extend horizontally and integrally from both sides of the positioning plate 11. The two protruding plates 113 are provided with two locking holes 1131. Two through-holes 111 are provided on the positioning plate 11 adjacent to the two protruding plates 113. The connecting portion between the positioning plate 11 and the protruding plate 113 is formed an integral abutting piece 112 protruding downwards toward the through-hole 111. The abutting piece 112 can swing elastically in the through-hole 111 to a reasonable extent.

Figure 3A:
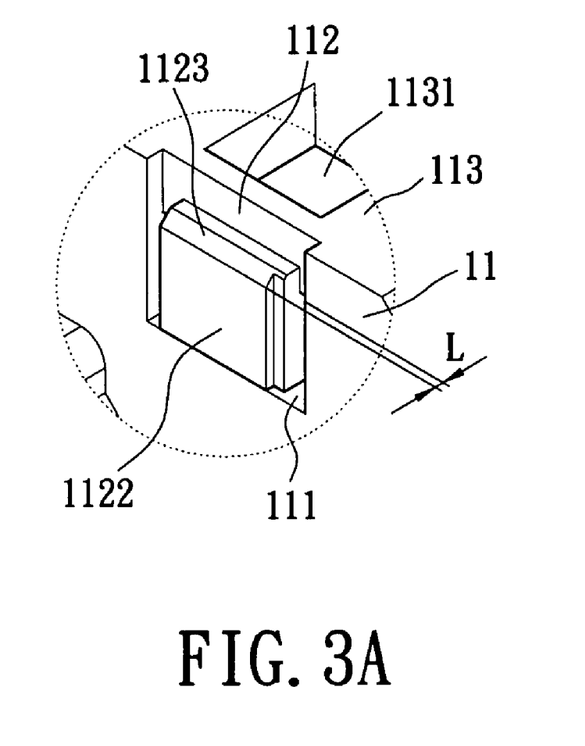
FIG. 3A is a perspective view showing the abutting piece of the preload biased structure of a linear rail according to the present invention.
Figure 3B:
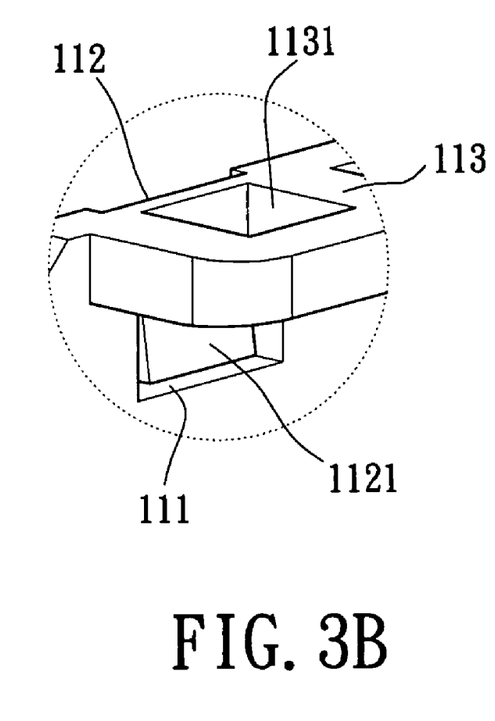
FIG. 3B is a perspective view showing the abutting piece of the preload biased structure of a linear rail according to the present invention from another viewing angle.
Figure 5:
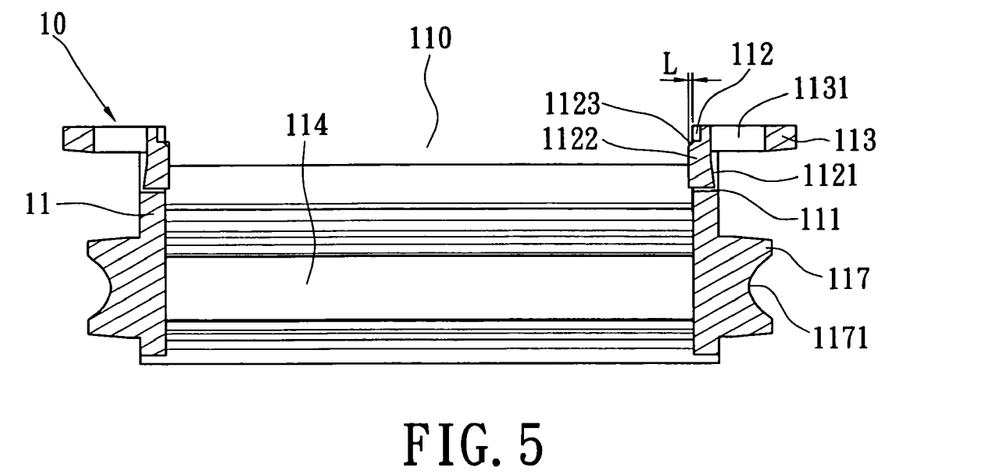
FIG. 5 is a cross-sectional view showing the sliding base of the preload biased structure of a linear rail according to the present invention.
Figure 6:
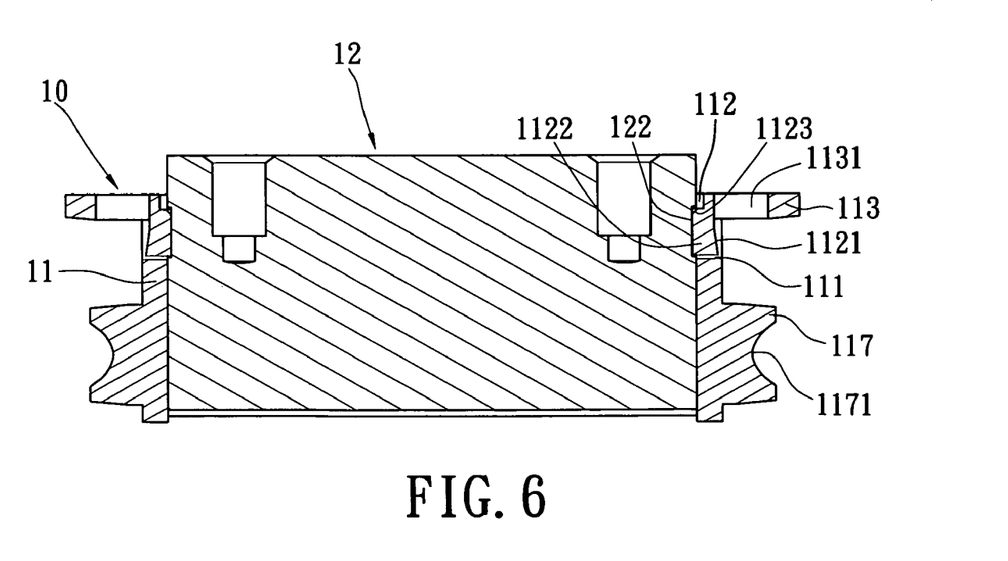
FIG. 6 is an assembled cross-sectional view showing the sliding base and the supporting element of the present invention.

Please refer to FIGS. 3A, 3B and 5. More specifically, one end of the abutting piece 112 facing the connecting space 110 extends horizontally to form a biased block 1122. The biased block 1122 is further provided with a biased slope 1123 for guiding the supporting element 12. The biased block 1122 extends to a suitable length and thus protrudes outside the through-hole 111, so that the biased block 1122 is not aligned with the positioning plate 11. In addition, the other end of the abutting piece 112 also extends obliquely to form a slope 1122 protruding outside the through-hole 111.

Figure 4:
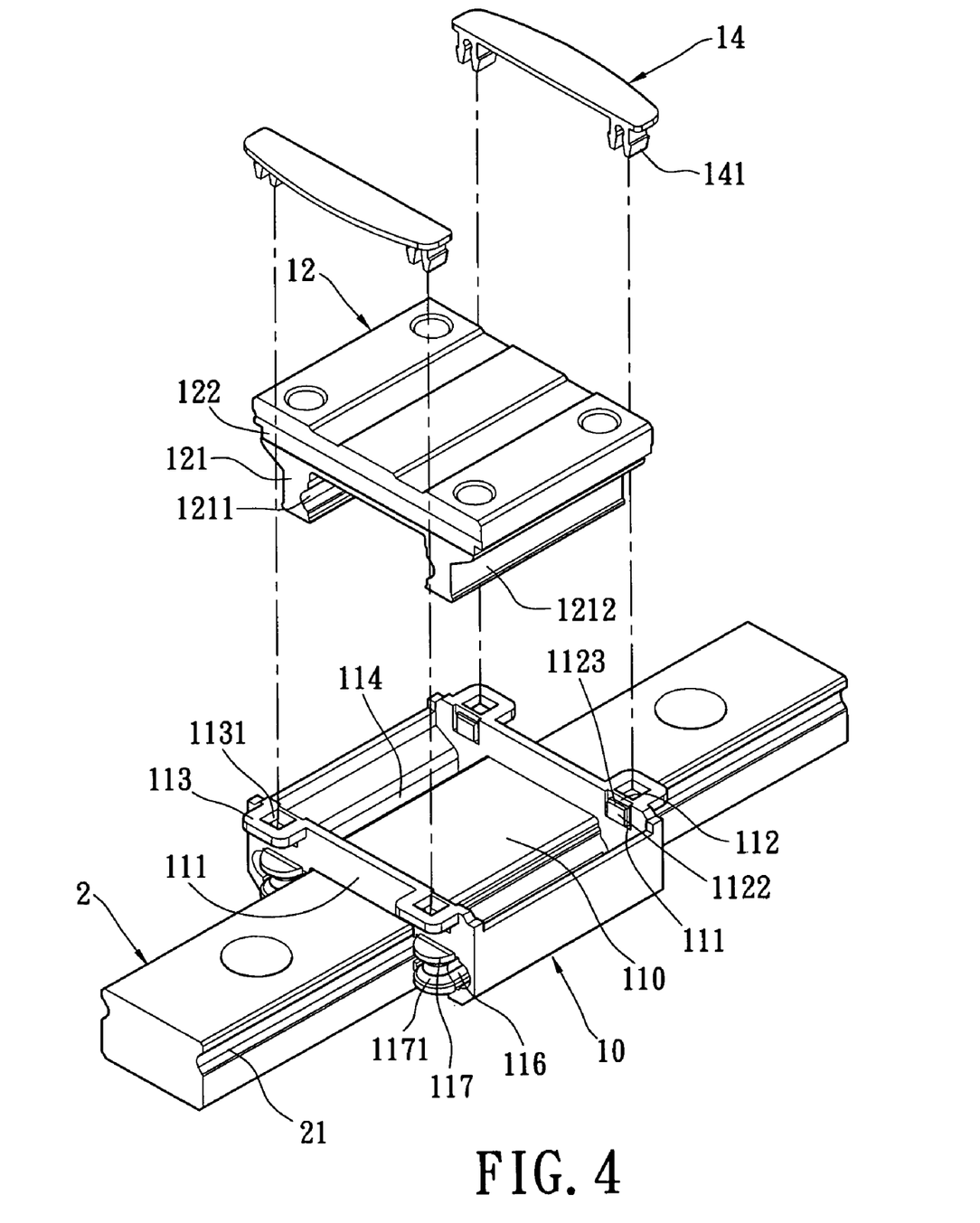
FIG. 4 is a partially exploded perspective view showing the preload biased structure of a linear rail according to the present invention.

Please refer to FIGS. 2 and 4. The sliding base 10 further has two hollow portions 114. The two hollow portions 114 form a vertically space on both sides of the sliding element 10. The sliding base 10 is formed with a supporting surface 115 respectively adjacent to the insides of the two hollow portions 114.

Further, near the two hollow portions 114, the sliding base 10 has two first passages 116 through the front and rear end of the sliding base 10. The two first passages 116 are formed on the other side wall separated from the two supporting surfaces 115. The sliding base 10 has a pair of roller guides 117 at its front and rear end respectively. The roller guide 117 is provided with a round groove 1171 of 180 degrees. One end of the round groove 1171 is connected to the outlet of the first passage 116.

The supporting element 12 is inserted in the connecting space 110. The supporting element 12 has two guiding rails 121 corresponding to the two hollow portions 114 and two troughs 122 corresponding to the biased blocks 1122. The troughs 122 are provided on the front and rear end of the supporting element 12. In assembling, the biased blocks 1122 are engaged in the troughs 122 (FIG. 6), thereby preloading the supporting element 12 in the sliding base 10. In addition, the two guiding rails 121 extend downwards from the bottom of the supporting element 12. The inner surfaces of the two guiding rails 121 each have a first guiding slot 1211 along their entire length. The opposite outside surfaces of the two guiding rails 121 have a curved abutting surface 1212. The abutting surface 1212 is formed to correspond with the supporting surface 115. The two guiding rails 121 of the supporting element 12 penetrate the two hollow portions 114 of the sliding base 10 respectively, so that the abutting surfaces 1212 of the supporting element 12 tightly adhere to the supporting surfaces 115 of the sliding base 10. Adhesive is applied between the abutting surface 1212 and the supporting surface 115, thereby fixing the supporting element 12 on the sliding base 10.

Figure 7A:
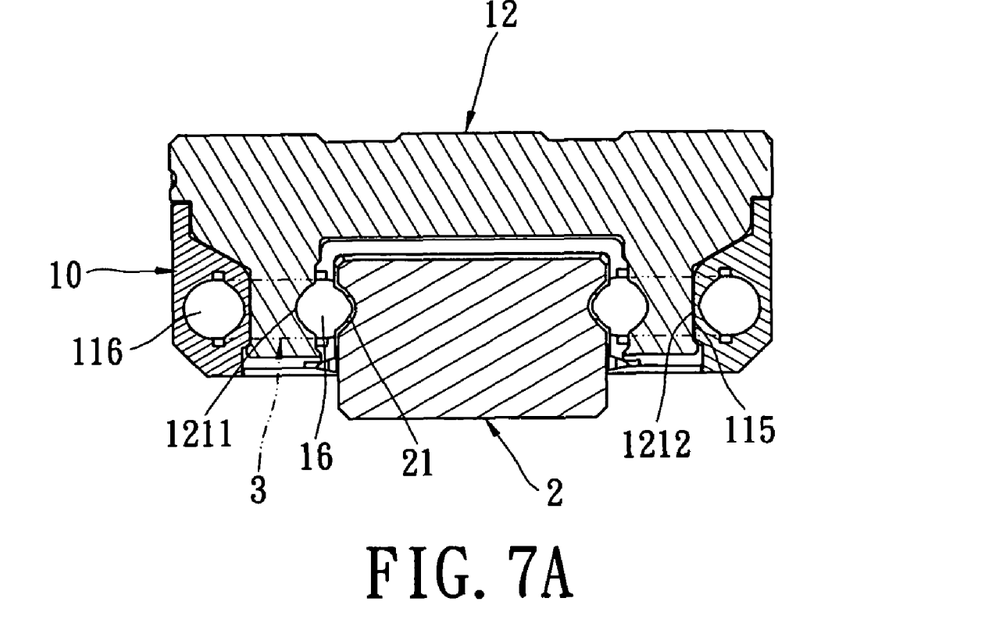
FIG. 7A is an assembled cross-sectional view showing the preload biased structure of a linear rail according to the present invention.
Figure 7B:
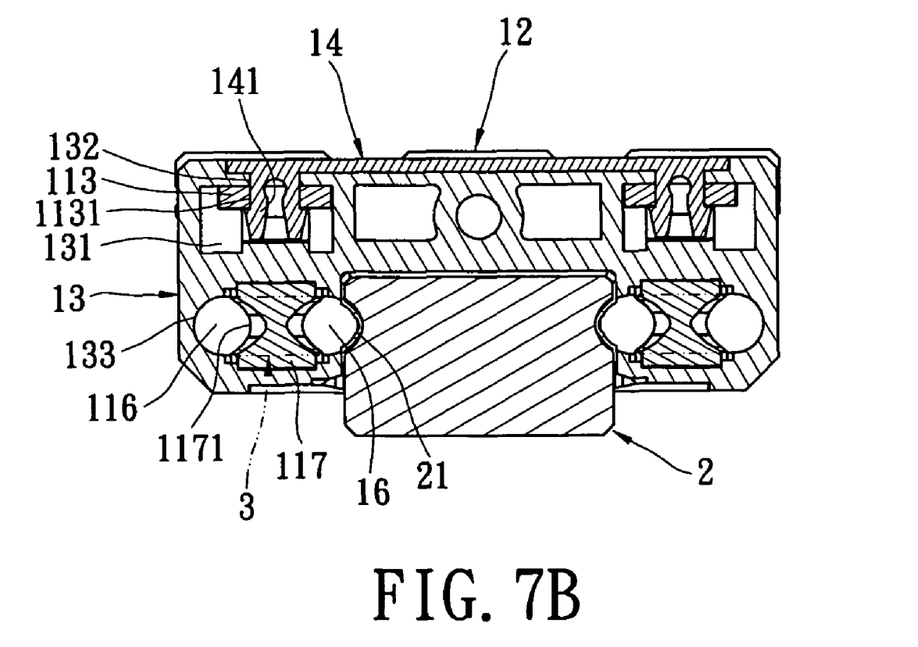
FIG. 7B is a schematic view showing a bearing of the preload biased structure of a linear rail according to the present invention.

Please refer to FIGS. 2, 4 and 7A. Both sides of the rail 2 each have a second guiding slot 21. The second guiding slot 21 and the first guiding slot 1222 are formed to be recessed oppositely. Via this arrangement, when the supporting element 12 is disposed in the connecting space 110, a second passage 16 is formed between the first guiding slot 1222 and the second guiding slot 21 along the sliding base 10. The roller guide 117 is provided between the first passage 116 and the second passage 16 (FIG. 7B). Both ends of the round groove 1171 are connected to the outlets of the first passage 116 and the second passage 16 respectively.

The two connecting pieces 13 are provided on the front and rear end of the sliding base 10 respectively. The ends of the two connecting pieces 13 facing the sliding base 10 are provided with insertion slots 131. The protruding plates 113 on the front and rear end of the sliding base 10 are inserted into the insertion slots 131 respectively. In addition, both sides of the top surface of the two connecting pieces 13 are provided with two insertion holes 132 respectively. The two insertion holes 132 are in communication with the insertion slots 131 and thus are provided at the positions corresponding to the locking holes 1131 of the protruding plates 113.

Please refer to FIGS. 2, 4, 7a and 7B. The ends of the connecting piece 13 facing the sliding base 10 are further provided with two curved recesses 133 corresponding to the round grooves 1171 of the roller guide 117. The curved recess 133, the first passage 116, the second passage 16 and the round groove 1171 together form a roller bearing 3. More specifically, a closed roller bearing 3 is formed respectively between the sliding block 1 and both sides of the rail 2.

In order to make the sliding block 1 to move on the rail 2 smoothly, a plurality of rolling elements 4 is disposed between the sliding block 1 and the rail 2. That is, the roller bearing 3 allows the plurality of rolling elements 4 to circulate between the sliding block 2 and the rail 2. Further, the plurality of rolling elements 4 can be balls, rolling needles or rolling posts, but they are not limited thereto. In the present embodiment, the rolling elements 4 are balls. Further, the plurality of rolling elements 4 is provided on a holder 5. The holder 5 is used to separate the respective rolling elements 4, so that a string of rolling elements 5 can be disposed in the roller bearing 3. Via these rolling elements 4, the sliding block 1 can generate a linear displacement on the rail 2.

Further, a scraping piece 15 is provided in order to avoid foreign particles from entering the roller bearing 3, when the sliding block 1 moves on rail 2. Both ends of the scraping piece 15 extend to form a scraper 151 respectively, so that the scraping piece is substantially formed into a U shape. The scraping piece 15 is connected to the two connecting pieces 13. The two scrapers 151 of the scraping piece 15 abut the surface of the rail 2, so that the scrapers 151 of the scraping piece 15 can scrape off foreign particles on the rail 2 when the sliding block 1 moves on the rail 2, thereby avoiding the foreign particles from affecting the action of the sliding block 1.

Both sides of the bottom surface of the locking piece 14 extend downwards to form two hooks 141. The two hooks 141 are formed transversely in the left-and-right direction. The two hooks 141 penetrate the locking holes 1131 of the protruding plate 113 and the insertion holes 132 of the connecting piece 13. The two hooks 141 are further hooked to the lower edge of the protruding plates 113. At the same time, one end of the hook 141 abuts the positioning plate 11 adjacent to the periphery of the through-hole 111, thereby locking the two connecting pieces 13 on the front and rear end of the sliding base 10.

When the hook 141 is hooked to the protruding plate 113, the hook 141 is inserted in the insertion slot 131 to abut the slope 1121 on one end of the abutting piece 112, thereby pushing the biased block 1122 of the abutting piece 112 to extend toward the connecting space 110. In this way, the biased block 122 is pressed in the trough 122 of the supporting element 12 completely. That is, the abutting pieces 112 of the two positioning plates 11 abut the front and rear end surfaces of the supporting element 12 simultaneously.

Figure 8:
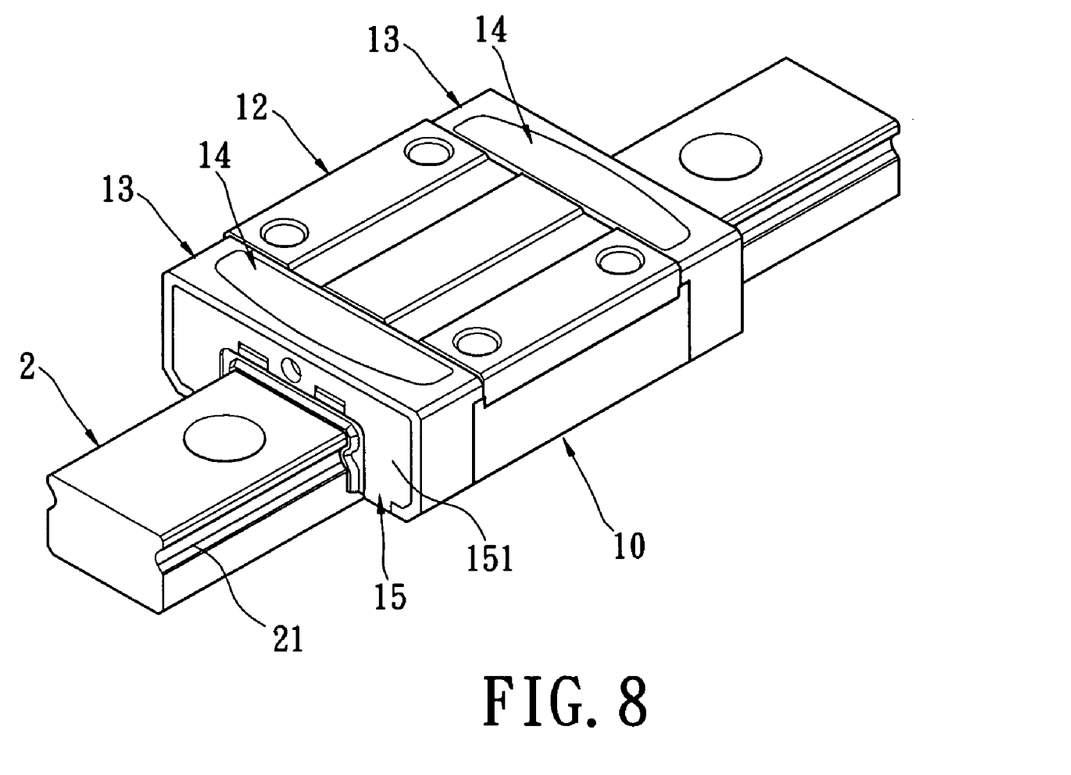
FIG. 8 is an assembled perspective view showing the preload biased structure of a linear rail according to the present invention.

Therefore, as shown in FIG. 8, the above-mentioned constituent elements form a linear rail. The sliding block 1 can generate an expected linear displacement on the rail 2. The present invention has advantageous features as follows.

(I) In assembling, the biased block 1122 of the abutting piece 112 provides a preloaded effect, so that the sliding base 10 and the supporting element 12 can be locked to each other when the supporting element 12 is inserted in the connecting space 110, thereby avoiding the supporting element 12 from falling off the connecting space 110.

(II) The locking piece 14 is inserted in the insertion slot 131 to abut the slope 1121 of the abutting piece 112, so that the biased block 1122 of the abutting piece 112 is pressed in the trough 122 of the supporting element 12 completely. In this way, the locking piece 14 exerts a biased force to both ends of the supporting piece 14, so that the supporting element 12 and the two connecting pieces can be assembled on the sliding base 10 tightly and firmly, thereby avoiding the vibrations, noises and wear. As a result, the linear rail can generate a precise displacement more smoothly.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A preload biased structure of a linear rail, comprising:
a rail;
a sliding block slidably disposed on the rail, the sliding block having:
a sliding base, the front and rear end of the sliding base each having a positioning plate, a connecting space being formed between the two positioning plates, each positioning plate having two protruding plates and two through-holes, the two protruding plates extending integrally from both sides of the positioning plate, the protruding plate being provided with a locking hole, the through-hole passing through the protruding plate adjacent to the positioning plate, an abutting piece protruding downwards from the connecting portion between the positioning plate and the protruding plate toward the through-hole respectively, a biased block extending from one end of each abutting piece facing the connecting space, each biased block being provided with a biased slope, and the other end of each abutting piece being provided with a slope;
a supporting element provided in the connecting space, the front and rear end of the supporting element being provided with a trough corresponding to the biased block, each biased slope guiding the supporting element to lock the biased block into the trough, thereby preloading and fixing the supporting element;
two connecting pieces connected to the front and rear end of the sliding base respectively, each connecting piece being provided with two insertion slots corresponding to the two protruding plates of the sliding base, each protruding plate being inserted in the insertion slot, the top surface of each connecting piece being provided with two insertion holes for communicating the two insertion slots; and
two locking pieces, both sides of the bottom surface of the locking piece extending downwards to form a hook respectively, the hook penetrating the insertion hole and the locking hole to be inserted into the insertion slot, thereby hooking the connecting piece to the front and rear end of the sliding base, wherein the hook abuts the slope respectively to press each biased block into the trough of the supporting element.

2. The preload biased structure of a linear rail according to claim 1, wherein the biased block extends to a suitable length and thus protrudes outside the through-hole, so that the biased block is not aligned with the positioning plate.

3. The preload biased structure of a linear rail according to claim 1, wherein the sliding base has two first passages through the front and rear end of the sliding base, the passages each having an outlet at either end.

4. The preload biased structure of a linear rail according to claim 3, wherein both sides of the supporting element extend downwards to form two integral guiding rails, the outside of each guiding rail has an abutting surface, the sliding base has two hollow portions to correspond to the guiding rails, the inside of the sliding base has a supporting surface adjacent to each hollow portion, each guiding rail penetrates the hollow portion, and each abutting surface adheres to the supporting surface.

5. The preload biased structure of a linear rail according to claim 4, wherein the inside of each guiding rail has a first guiding slot along its entire length, both sides of the rail are each provided with a second guiding slot corresponding to the respective first guiding slot, the two first guiding slots and the two second guiding slots form two second passages respectively.

6. The preload biased structure of a linear rail according to claim 5, wherein the front and rear end of the sliding base are each provided with two roller guides, the roller guide is provided between the outlets of the first passage and the second passage, the roller guide is formed with a round groove, the round groove is connected to the outlets of the first passage and the second passage.

7. The preload biased structure of a linear rail according to claim 6, wherein the two connecting pieces each have two curved recesses, whereby the curved recess, the first passage, the second passage and the round groove of the roller guide together form a roller bearing.

8. The preload biased structure of a linear rail according to claim 7, wherein the sliding block is provided with a plurality of rolling elements, the rolling elements are provided on a holder, the rolling elements and the holder are disposed in the roller bearing.

9. The preload biased structure of a linear rail according to claim 1, further comprising a scraping piece, both ends of the scraping piece extending to form a scraper, the scraping piece being connected to the two connecting pieces, and the scraper abuts the surface of the rail.

10. The preload biased structure of a linear rail according to claim 1, wherein the hook extends downwards from the locking piece and is formed transversely in the left-and-right direction, the hook is hooked to the lower edge of the protruding plate, and the hook abuts one end of the positioning plate.

\* \* \* \* \*